(12) United States Patent
Komiyama et al.

(10) Patent No.: US 6,864,771 B2
(45) Date of Patent: Mar. 8, 2005

(54) ELECTROMAGNETIC ACTUATOR

(75) Inventors: Tadashi Komiyama, Chiryu (JP);
Katsuhiro Kuroki, Nagoya (JP); Koji Sakurai, Chita-gun (JP); Michio Koshimizu, Toyohashi (JP); Kazuto Maeda, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/151,820

(22) Filed: May 22, 2002

(65) Prior Publication Data

US 2002/0175569 A1 Nov. 28, 2002

(30) Foreign Application Priority Data

May 22, 2001 (JP) ........................................ 2001-152384

(51) Int. Cl.[7] ................................................. H01F 7/08
(52) U.S. Cl. ................................. 335/220; 251/129.15
(58) Field of Search ................................ 335/251–262, 335/220–229, 281–282; 251/129.1–129.19

(56) References Cited

U.S. PATENT DOCUMENTS

| | | | | |
|---|---|---|---|---|
| 4,651,118 A | * | 3/1987 | Zeuner et al. | 335/258 |
| 5,960,776 A | * | 10/1999 | Everingham et al. | 123/568.26 |
| 6,453,934 B1 | * | 9/2002 | Bircann et al. | 137/242 |
| 6,538,543 B2 | * | 3/2003 | Bircann et al. | 335/220 |
| 6,644,622 B2 | * | 11/2003 | Modien | 251/129.15 |

FOREIGN PATENT DOCUMENTS

JP 2000-274546 10/2000

* cited by examiner

*Primary Examiner*—Lincoln Donovan
(74) *Attorney, Agent, or Firm*—Nixon & Vanderhye PC

(57) ABSTRACT

The electromagnetic valve has an electromagnetic actuator for operating a valve. The electromagnetic actuator has a movable core that reciprocally moves in an axial direction. A stator core has an attracting portion. The attracting portion has a conical portion that is defined by a uniform diameter inner surface and an outwardly inclined outer surface. The outer surface has a smaller diameter at a position closer to an initial position of the plunger. Therefore outer diameter of the conical portion is increased in an attracting direction of the plunger. Moreover, increasing rate of the outer diameter is decreased in the attracting direction. Therefore the outer surface has a greater inclination angle at a position closer to an initial position of the plunger.

25 Claims, 6 Drawing Sheets

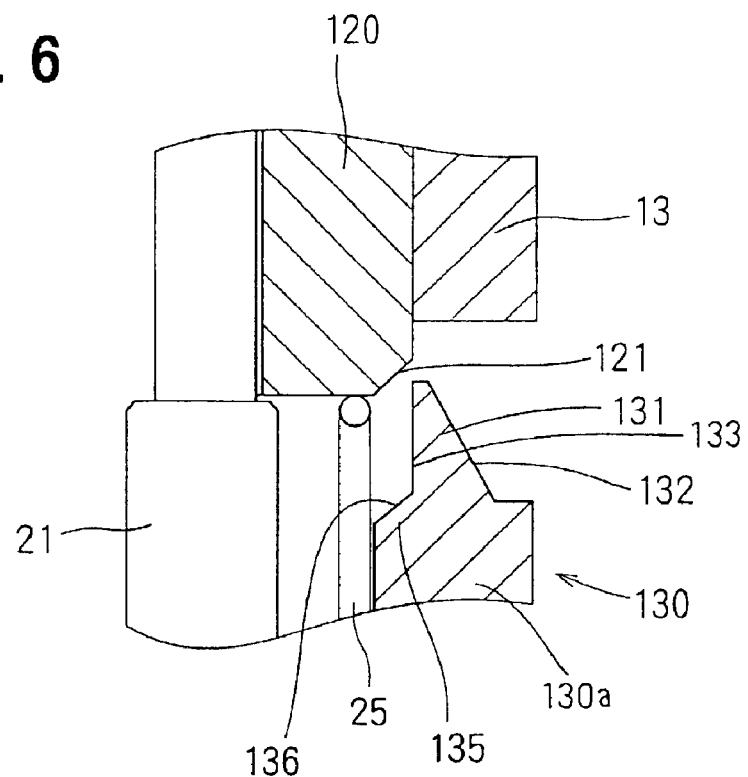
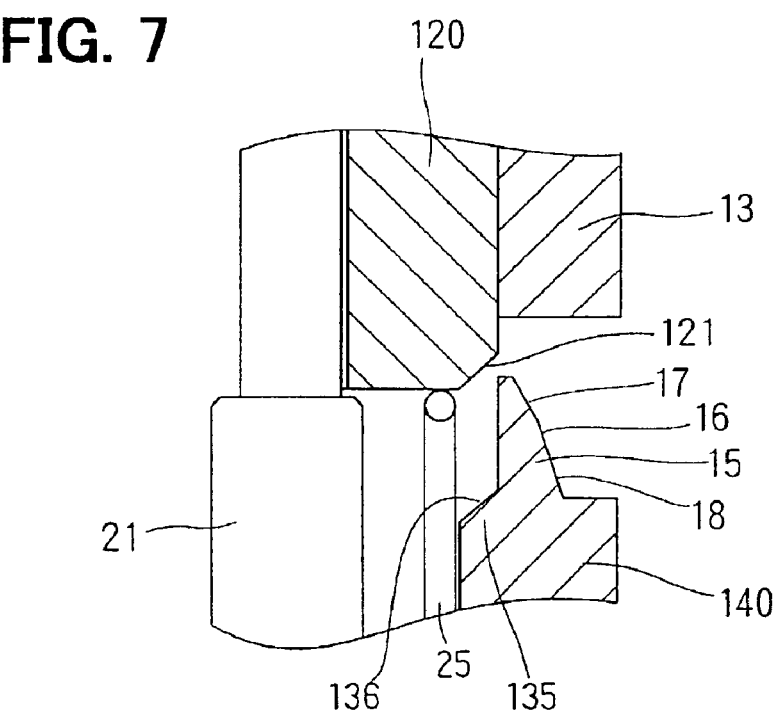

ELECTROMAGNETIC ACTUATOR

CROSS REFERENCE TO RELATED APPLICATION

This application is based on Japanese Patent Application No. 2001-152384 filed on May 22, 2001 the contents of which are incorporated herein by reference.

BACKGROUND OF THE INVENTION

1. Field of the Invention

The present invention relates to an electromagnetic actuator having a coil, a stator core and a movable core.

2. Description of Related Art

In order to increase a maximum flow amount of a valve, it is necessary to increase a maximum opening degree of the valve, and to increase a stroke of a movable core of an electromagnetic actuator that operates the valve. However, a long stroke arrangement requires a wider gap between the movable core and a stator core. For example, when the movable core and the stator core face in a stroke direction, e.g. axial direction, of the movable core, widening the gap between the cores directly causes a reduction of the magnetic flux. Therefore, the electromagnetic actuator needs a larger coil with greater ampere-turn to attract the movable core against an urging spring over the increased stroke.

SUMMARY OF THE INVENTION

It is an object of the present invention to provide an electromagnetic actuator having a long stroke.

It is another object of the present invention to provide an electromagnetic actuator having a long stroke with a small body.

It is a still another object of the present invention to provide an electromagnetic actuator having an improved core arrangement that provides sufficient attracting force over an entire stroke of the electromagnetic actuator.

According to a first aspect of the present invention, an electromagnetic actuator comprises a coil, a movable core, and a stator core that forms a magnetic flux circuit with the movable core and attracts the movable core in an attracting direction when the coil is energized. The stator core comprises a housing portion that houses the movable core, and an attracting portion located on an attracting side relative to the housing portion. The attracting portion having an inner surface that has a uniform diameter over a movable range of the movable core, and an outer surface. The outer surface is defined by a variable diameter. The diameter is increased in the attracting direction as a distance from an initial position is increased. An increasing rate of the diameter is decreased in the attracting direction. Since the outer surface is defined with an increasing diameter, the outer surface generally guides the magnetic flux in an oblique direction to pass the attracting portion and the movable core. Additionally, since the increasing rate of the diameter of the outer surface is decreased, an auxiliary magnetic flux is directed in an oblique direction even when the movable core is attracted a certain distance from an initial position. As a result, it is possible to provide a greater attracting force on the movable core even when the movable core is attracted a certain distance.

According to a second aspect of the present invention, an electromagnetic actuator comprises a coil, a movable core, and a stator core that forms a magnetic flux circuit with the movable core and attracts the movable core in an attracting direction when the coil is energized. The stator core comprises a housing portion that houses the movable core, an attracting portion located on an attracting side relative to the housing portion, and an axial facing portion located on the attracting side relative to the movable core to face the movable core in an axial direction. The attracting portion has an inner surface that has a uniform diameter over a movable range of the movable core, and an outer surface. The diameter of the outer surface is uniformly increased in the attracting direction. Since the outer surface is defined with an increasing diameter, the outer surface generally guides the magnetic flux in an oblique direction to pass the attracting portion and the movable core. Additionally, since the axial facing portion faces the movable core in the axial direction, an auxiliary magnetic flux is provided in the axial direction even when the movable core is attracted a certain distance from an initial position. As a result, it is possible to provide a greater attracting force on the movable core even when the movable core is attracted a certain distance.

According to a third aspect of the present invention, an electromagnetic actuator comprises a coil, a movable core, and a stator core that forms a magnetic flux circuit with the movable core and attracts the movable core in an attracting direction when the coil is energized. The stator core comprises a housing portion that houses the movable core, an attracting portion located on an attracting side relative to the housing portion, for providing a magnetic flux passing through the attracting portion and the movable portion in an oblique direction. The attracting portion having an inner surface that has a uniform diameter over a movable range of the movable core and faces an outer surface of the movable core, and an outer surface having diameter that is increased in the attracting direction. The stator core further comprises means for providing an auxiliary magnetic flux passing through the attracting portion and the movable core in the oblique direction or an axial direction when the movable core is attracted a predetermined distance from an initial position. The outer surface generally guides the magnetic flux in an oblique direction to pass the attracting portion and the movable core. Additionally, the means for providing the auxiliary magnetic flux is provided for providing the auxiliary magnetic flux in the oblique direction or the axial direction even when the movable core is attracted a certain distance from an initial position. As a result, it is possible to provide a greater attracting force on the movable core even when the movable core is attracted a certain distance.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 6 is an enlarged sectional view of the electromagnetic actuator according to a fourth embodiment of the present invention;

FIG. 7 is an enlarged sectional view of the electromagnetic actuator according to a fifth embodiment of the present invention;

DETAILED DESCRIPTION OF PREFERRED EMBODIMENTS

Figure 1:
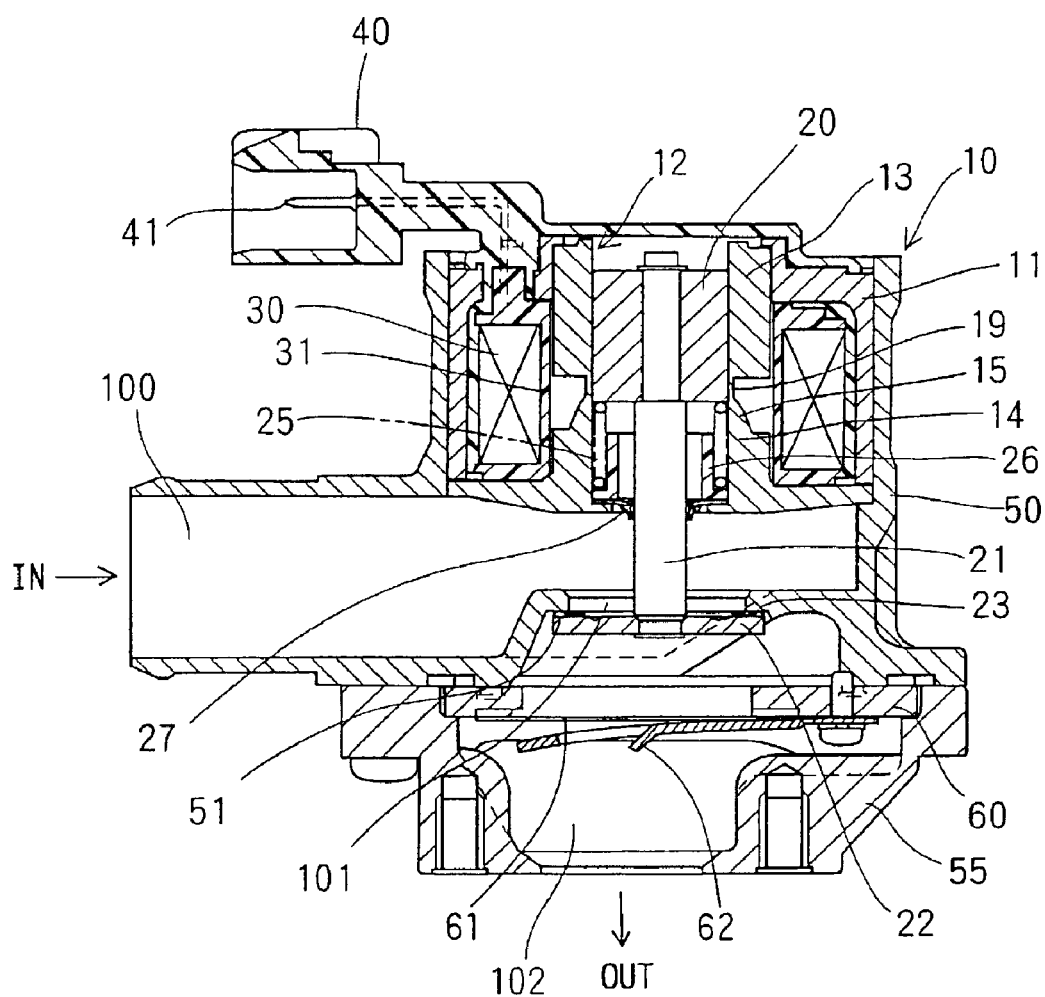
FIG. 1 is a sectional view of a secondary air control valve having an electromagnetic actuator according to a first embodiment of the present invention.
Figure 2:
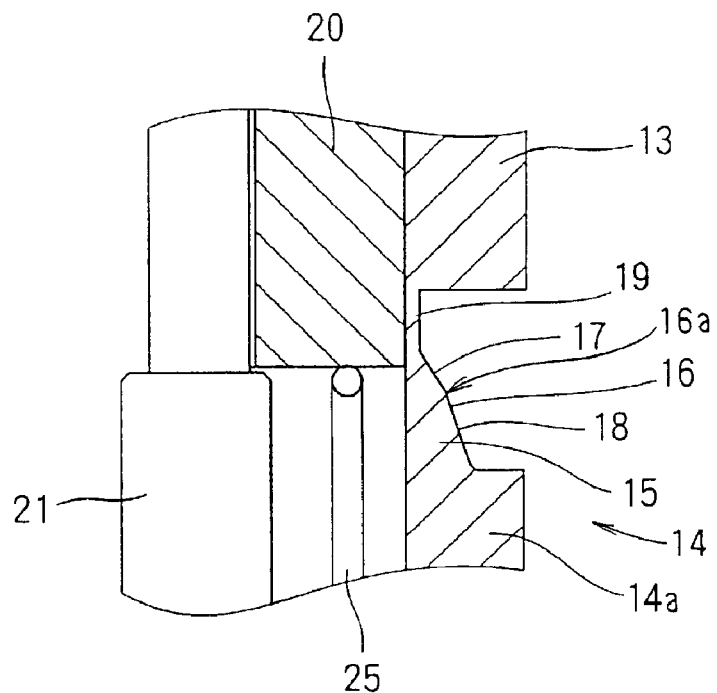
FIG. 2 is an enlarged sectional view of the electromagnetic actuator according to the first embodiment of the present invention.

FIGS. 1 and 2 are sectional views showing an electromagnetic valve with an electromagnetic actuator according to a first embodiment of the present invention. FIG. 2 is a sectional view showing an enlarged view of a part of the electromagnetic valve. The electromagnetic valve (EMV) 10 is a secondary air control valve for a vehicle. The EMV 10 is disposed on a conduit connected with an exhaust pipe of the vehicle, and controls a secondary air amount supplied from an air pump to the exhaust pipe. For example, the EMV 10 opens and introduces the secondary air into the exhaust pipe to burn burnable components in exhaust gas when the engine is just after a starting. As a result, an exhaust temperature is increased so as to accelerate warming up of a catalyst for purifying exhaust gas. The EMV 10 has an electromagnetic actuator portion according to the present invention and a valve portion.

The electromagnetic actuator portion has a yoke 11, a stator core 12, a plunger 20, a coil 30 and a bobbin 31. The yoke 11 is formed in a cylindrical shape and provides a stator with the stator core 12. The plunger 20 provides a movable core. The plunger 20 is supported in the stator core 12 movably in a vertical direction. The yoke 11, the stator core 12, and the plunger 20 are made of magnetic material, and provide a magnetic circuit in which a magnetic flux for attracting the plunger 20 passes.

The stator core 12 has integrally formed three portions, a housing portion 13, an attracting portion 14, and a thin wall portion 19. The thin wall portion 19 is formed between the housing portion 13 and the attracting portion 14, and provides a magnetic restricting portion for preventing a bypassing magnetic flux. The thin wall portion 19 simultaneously improves a mechanical strength of the stator core 12. The plunger 20 can be coaxially installed into the stator core 12 with high accuracy due to the integral arrangement of the housing portion 13 and the attracting portion 14. It is possible to decrease a radial clearance between the stator core 12 and the plunger 20 due to the integral arrangement.

The housing portion 13 supports the plunger 20 movable in a reciprocal manner. The housing portion 13 has an inner surface that faces an outer surface of the plunger 20 so that the magnetic flux radially passes through the housing portion 13 and the plunger 20. At least one of an inner surface of the housing portion 13 and an outer surface of the plunger 20 is covered with a non-magnetic material such as a Nickel-Phosphorus plating so as to decrease the radial clearance therebetween. A stopper 26 made of resin is disposed on a bottom flange formed on a bottom end of the inner periphery of the stator core 12. The stopper 26 is disposed on an end in an attracting direction of the plunger 20 so that the plunger 20 rests on the stopper 26 when the plunger 20 reaches to an axial end of movement in the attracting direction. Therefore the stopper 26 defines a maximum stroke of the electromagnetic actuator and a maximum opening degree of the valve. A spring 25 is disposed between the plunger 20 and the stopper 26 as an urging means for urging the plunger 20 in a direction opposite to the attracting direction. An initial position of the plunger 20 is shown in FIGS. 1 and 2, and is defined by a valve member described later. The coil 30 and the bobbin 31 are disposed on a radial outside of the stator core 12. A cover 40 is provided on an axial end of the yoke 11 to cover the components. The cover 40 also provides a connector having terminals 41 that connected with the coil 30. The coil 30 generates a magnetic flux through the yoke 11, the stator core 12 and the plunger 20 when a current supplied via the terminals.

A shaft 21 is connected with the plunger 20 to move together. A circular plate 22 is attached on a lower end of the shaft 21. An annular rubber member 23 is fixed on a plunger side surface of the plate member 22. The shaft 21, the plate member 22 and the rubber member 23 provide a valve member. A seal member 27 is provided between the stopper 26 and the stator core 12. The seal member 27 has a hole in which the shaft 21 passes, and slidingly contacts with the shaft 21 to prevent foreign materials.

A first housing member 50 and a second housing member 55 define the conduit of the secondary air and provide a valve housing. The first housing member 50 defines a conduit 100 and a cavity that receives the yoke 11. The first housing member 50 defines a through hole 101 in which the shaft 21 passes. A valve seat 51 surrounding the through hole 101 is provided on a lower surface. The valve seat 51 works with the rubber member 23 and the plate 22, and provides a valve. The second housing member 55 is attached on the first housing member 50 to cover the valve, and defines a conduit 102 leading to the exhaust pipe. The second housing member 55 supports a one-way valve. The one-way valve has a support plate 60 sandwiched between the first and second housing members 50 and 55. The support member 60 supports a plate valve 61, and a stopper plate 62 that defines an opening degree of the plate valve 61.

The plunger 20 is normally positioned in the initial position that is a first position. The plunger 20 is always urged in a first direction toward the first position by the spring 25. When the coil 30 is energized, the plunger 20 is attracted in a second direction toward a second position. When the plunger 20 is fully attracted, the plunger 20 rests on the stopper 26 and reaches to the second position.

Referring to FIG. 2, the attracting portion 14 is located on a side closer to the second position relative to the housing portion 13. The attracting portion 14 has a main portion 14a that has a uniform thickness, and a conical portion 15 located between the main portion 14a and the thin wall portion 19. The housing portion 13, the thin wall portion 19, the conical portion 15 and the main portion 14a have a uniform inner diameter over an entire movable range of the plunger 20. The housing portion 13 provides a uniform cross-sectional area over the entire movable range of the plunger 20. The thin wall portion 19 provides a uniform cross-sectional area over the entire movable range of the plunger 20. The main portion 14a provides a uniform cross-sectional area over the entire movable range of the plunger 20. The conical portion 15 provides an ascending cross-sectional area with respect to a distance from the thin wall portion 19. The cross-sectional area of the conical portion 15 is gradually increased as the distance from the thin wall portion increases. That is, the cross-sectional area of the conical portion 15 is gradually increased in the second direction. The cross-sectional area of the conical portion 15 is increased over a range including the movable range of the plunger 20. The smallest cross-sectional area of the conical portion 15 is equal to the cross-sectional area of the thin wall portion 19. The largest cross-sectional area of the conical portion 15 is smaller than the cross-sectional area of the main portion 14a. Therefore, a step defined by a perpendicular wall is formed between the conical portion 15 and the main portion 14a.

The conical portion 15 has an outer surface 16. A diameter of the outer surface 16 is gradually increased from the thin wall portion 19 to the main portion 14a in the second direction. The outer surface 16 is defined by a plurality of tapered surfaces that have different inclinations. The tapered surface positioned close to the main portion 14a has a smaller inclination angle with respect to the axis. Therefore, the inclination angles of the tapered surfaces are decreased in the second direction. In this embodiment, the outer surface 16 is defined by a first tapered surface 17 and a second tapered surface 18. Each of the tapered surfaces 17 and 18 has a uniform inclination angle with respect to the axis. The tapered surface 17 has a larger inclination angle to the tapered surface 18. Therefore, the outer diameter of the conical portion 15 is increased with predetermined increasing rates in the second direction. The increasing rates are nonlinearly decreased at a boundary 16a of the tapered surfaces 17 and 18. The outer surface 16 may be defined by three tapered surfaces.

The conical portion 15 begins at a position where a bottom edge of the plunger 20 is located while the plunger 20 is in the first position as shown in FIG. 1. The conical portion 15 ends at a position where the bottom edge of the plunger 20 is located when the plunger 20 is in the second position as shown in FIG. 1. Therefore, the conical portion 15 is located radial outside of a movable range where the bottom edge of the plunger 20 moves axially. An axial length of the conical portion 15 is substantially equal to the movable range of the bottom edge of the plunger 20. A facing area of an inner surface of the attracting portion 14 and an outer surface of the plunger 20 is proportional to an attracted distance (stroke) of the plunger 20.

When the engine is just started, exhaust gas contains a lot of burnable components. In response to the engine start, the coil 30 is energized to attract the plunger 20 in the second direction toward the second position. The plunger 20 operates the plate 22 and the rubber member 23 so as to open the through hole 101. The secondary air supplied from the secondary air pump passes through the through hole 101 and supplied to the exhaust pipe. As a result, the burnable components in the exhaust gas burns and increases the exhaust gas temperature sufficient to warm up the catalyst to the active temperature. The EMV 10 opens the valve widely in order to supply sufficient secondary air into the exhaust pipe.

Figure 3:
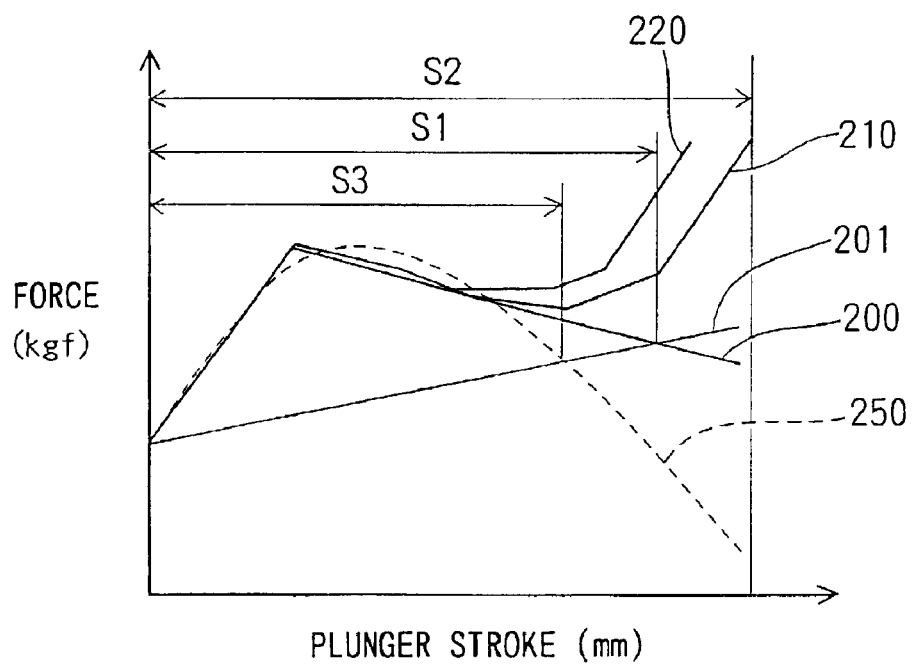
FIG. 3 is a graph showing relationships between a stroke and an attracting force.

FIG. 3 is a graph showing characteristics of an attracting force with respect to a stroke of the plunger. The stroke indicates a travel distance of the plunger 20 from the first position. The spring 25 provides an urging force indicated by a line 201. Therefore the plunger 20 can move when the electromagnetic actuator generates greater attracting force than that the line 201.

Line 200 shows a characteristic of the first embodiment described above. When the coil 30 is energized with a predetermined current, almost all of the magnetic flux flows obliquely between the plunger 20 and the conical portion 15. Therefore relatively large attracting force is achieved. The attracting force overcomes the spring force to move the plunger 20 and is increased until the plunger 20 reaches to a specific stroke. The conical portion 15 functions as a guide portion for guiding the magnetic flux in the oblique direction or an axial direction. As the plunger 20 moves in the second direction, a radial facing area between the plunger 20 and the attracting portion 14 (the conical portion 15) increases. The magnetic flux flowing in a radial direction increases rather than the oblique and axial directions, therefore the attracting force in the second direction is decreased. However, the conical portion 15 still guides the magnetic flux in the oblique and axial direction, since the increasing rate of the cross-sectional area of the conical portion 15 is decreased due to the second tapered surface 18. That is, although the radial facing area is increased as the plunger 20 moves in the second direction, the second tapered surface 18 suppresses the magnetic flux that tends to flow radially. That is, the second tapered surface 18 provides an auxiliary magnetic flux when the plunger 20 is attracted a predetermined distance from the initial position to the second position. In this embodiment, although the second tapered surface 18 functions as a magnetic flux restrictor over the entire movable range of the plunger 20, the second tapered surface 18 provides significant restriction when the plunger 20 is attracted a predetermined distance from the initial position. As a result, the attracting force can be maintained above the spring force over a longer stroke. The second tapered surface 18 suppresses lowering of the attracting force at an end of the stroke of the plunger 20. According to the first embodiment, it is possible to achieve a stroke S1 as shown in FIG. 3.

According to the first embodiment, it is possible to achieve a long stroke by improving a core arrangement. Moreover, since the first embodiment enables to use relatively small coil, it is possible to provide a small body electromagnetic actuator for operating a valve.

Figure 11:
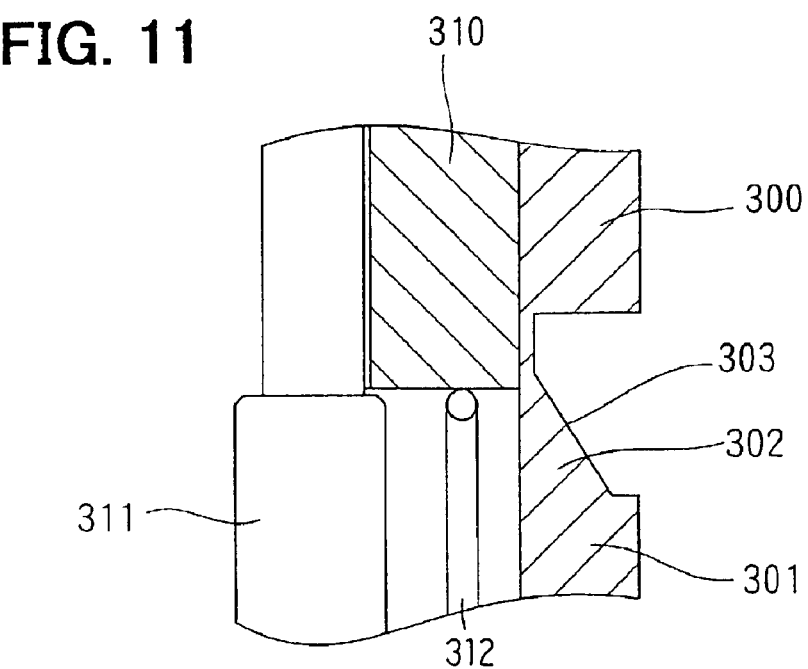
FIG. 11 is an enlarged sectional view of the electromagnetic actuator according to a comparative arrangement.

FIG. 11 shows an EMV as a comparative embodiment. According to the comparative embodiment, a plunger 310 connected with a shaft 311 is housed in a stator core. The stator core has a housing portion 300, an attracting portion 301, and a conical portion 302. The conical portion 302 has an outer surface that is defined by a tapered surface 303. The tapered surface 303 is uniformly inclined with respect to the axial direction. According to the arrangement shown in FIG. 11, the attracting force decreases sharply as the stroke increases. Referring to FIG. 3, a broken line 250 shows a characteristic of the comparative embodiment described above. The comparative embodiment can provide a stroke S3 that is shorter than the embodiment of the present invention.

Figure 4:
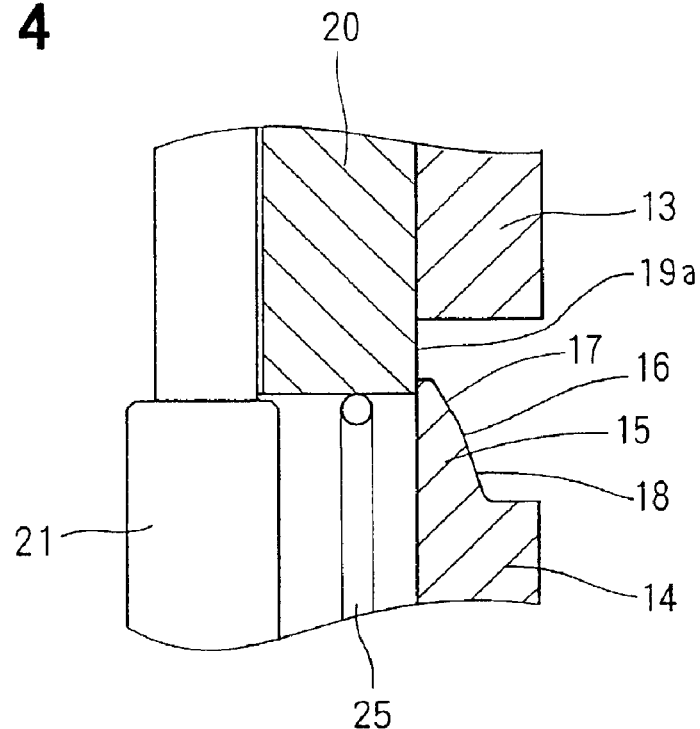
FIG. 4 is an enlarged sectional view of the electromagnetic actuator according to a second embodiment of the present invention.

FIG. 4 shows a second embodiment of the present invention. In the following embodiments, the same or equivalent elements are indicated with the same reference number and the explanations are not repeated. In this embodiment, the stator core 12 is provided by a separate arrangement of the housing portion 13 and the attracting portion 14. An air gap 19a is defined between the housing portion 13 and the conical portion 15 instead of the thin wall portion 19. This arrangement can provide similar advantages of the first embodiment except for the advantages provided by the thin wall portion 19.

Figure 5:
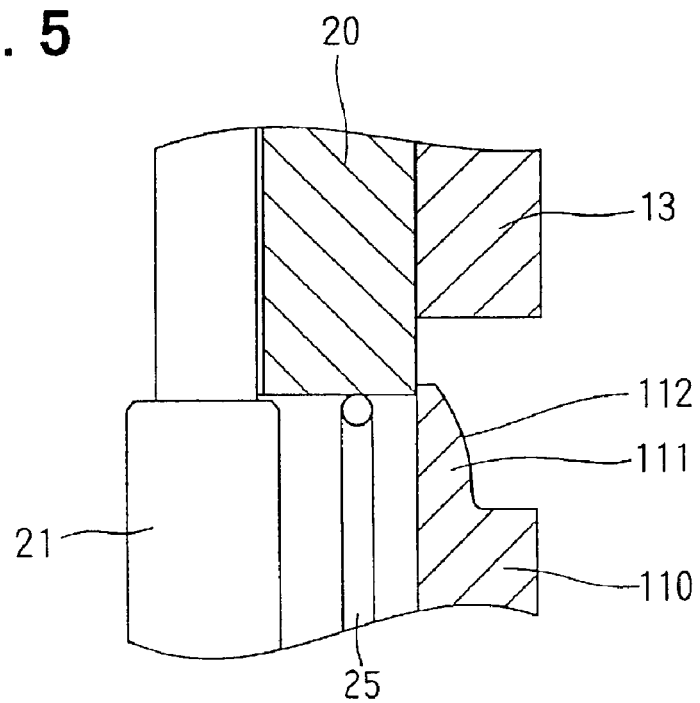
FIG. 5 is an enlarged sectional view of the electromagnetic actuator according to a third embodiment of the present invention.

FIG. 5 shows a third embodiment of the present invention. The third embodiment employs the separate arrangement of the stator core. In this embodiment, an attracting portion 110 has a conical portion 111. The conical portion 111 is defined with an outer surface 112 that is inclined outwardly in the second direction. The outer surface 112 is defined by a convex curve. The outer surface 112 provides the greatest inclination angle at a beginning end of the outer surface 112. The inclination angle is decreased as a distance from the beginning end is increased. The inclination angle is decreased to zero at a position close to the main portion 110a of the attracting portion 110. Therefore, a cross-sectional area of the conical portion 111 is gradually increased in the second direction. An increasing rate of the cross-sectional area is gradually decreased in the second direction. Moreover, the increasing rate is continuously decreased in the second direction.

FIG. 6 shows a fourth embodiment of the present invention. The fourth embodiment employs the separate arrangement of the stator core. In this embodiment, a plunger 120 has a conical surface 121 as an axial attracting surface on the corner. The conical surface 121 is inclined inwardly in the second direction. An attracting portion 130 has a main portion 130a, a conical portion 131 and an axial facing portion 135. The conical portion 131 is defined by an inclined outer surface 132 and a uniform diameter inner surface 133. The inclined outer surface 132 has a uniform inclination angle over an entire axial length. The axial facing portion 135 is protruding inwardly to provide an axial facing surface 136. The axial facing surface 136 is formed in an annular shape and faces the conical surface 121 in an axial direction. The axial facing surface 136 is inclined inwardly in the second direction. The surfaces 121 and 136 are formed in substantially parallel with respect to a circumferential direction and a radial direction so as to form a parallel gap therebetween. Therefore the surfaces 136 and 121 are distanced uniformly over entire surfaces.

According to the fourth embodiment, the attracting force is decreased as the plunger 120 is attracted and moves in the second direction due to an increase of the magnetic flux flowing radially. However, in the fourth embodiment, the conical surface 121 and the axial attracting surface 136 begins to generate an axial attracting force as the plunger 120 reaches closer to the second position. That is, the surfaces 121 and 136 provide an axially extending magnetic flux when the plunger 20 is attracted a predetermined distance from the initial position to the second position. As a result, the attracting force is increased as the plunger 120 reaches closer to the second position. Referring to FIG. 3, a line 210 shows a characteristic of the fourth embodiment. According to the fourth embodiment, it is possible to achieve a stroke S2 that is longer than that of the comparative embodiment.

Alternatively, the conical surface 121 and the axial attracting surface 136 may be formed by curved surfaces such as a convex surface and a concaved surface. Further, the axial attracting surface 136 may be formed in perpendicular to the axis. In this case, the plunger 120 is provided with a surface parallel to the axial attracting surface.

FIG. 7 shows an EMV of a fifth embodiment of the present invention. This embodiment shows a combination of the second and fourth embodiments. The conical portion 15 has the same arrangement to the second embodiment. The axial facing portion 135 has the same arrangement to the fourth embodiment. According to the fifth embodiment, it is possible to suppress lowering of the attracting force. Referring to FIG. 3, a line 220 shows a characteristic achieved by the fifth embodiment. The line 220 shows that the fifth embodiment can provide a greater attracting force than that of the first and fourth embodiment. Therefore, it is possible to ensure an operation of the valve due to the greater attracting force, and to enlarge an effective stroke of the EMV.

Figure 8:
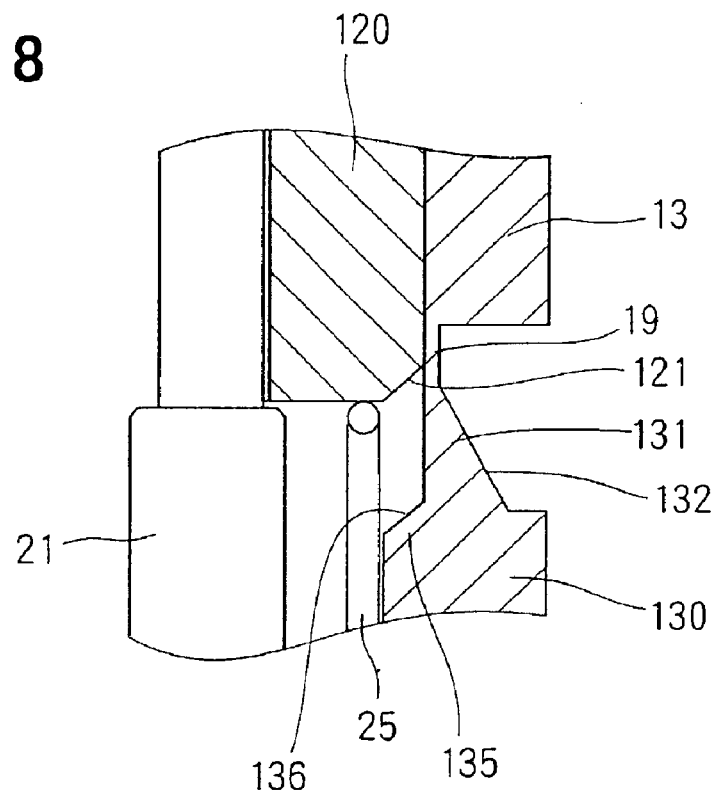
FIG. 8 is an enlarged sectional view of the electromagnetic actuator according to a sixth embodiment of the present invention.
Figure 9:
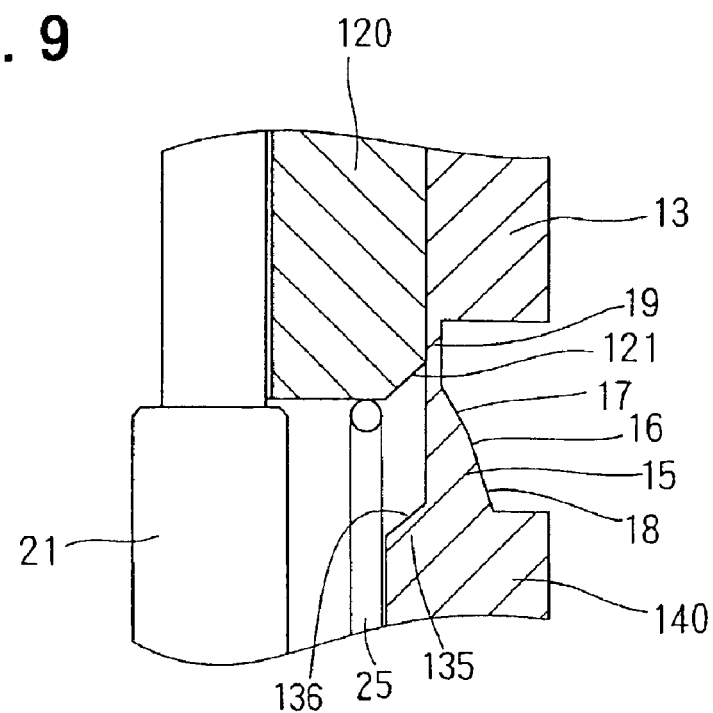
FIG. 9 is an enlarged sectional view of the electromagnetic actuator according to a seventh embodiment of the present invention.
Figure 10:
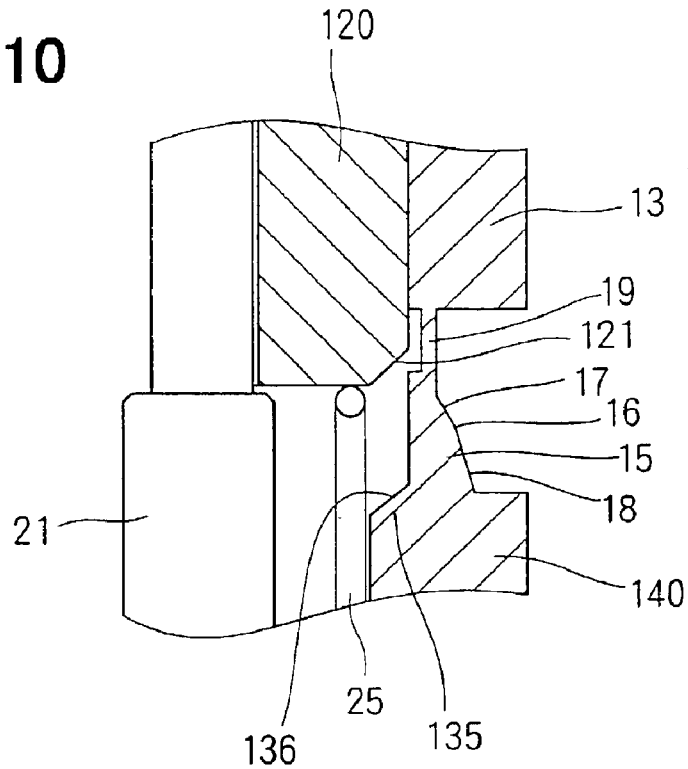
FIG. 10 is an enlarged sectional view of the electromagnetic actuator according to an eighth embodiment of the present invention.

FIG. 8 shows an EMV of a sixth embodiment of the present invention. This embodiment shows a combination of the fourth embodiment and the thin wall portion 19 described in the first embodiment. FIG. 9 shows an EMV of a seventh embodiment of the present invention. This embodiment shows a combination of the fifth embodiment and the thin wall portion 19 described in the first embodiment. According to the embodiments, it is possible to obtain the advantages of the thin wall portion 19 additionally to the other embodiments. FIG. 10 shows an EMV of an eighth embodiment of the present invention. In the eighth embodiment, the thin wall portion 19 is thinner than the other embodiments by forming an inner groove on the inner surface. The thin wall portion 19 has a different inner diameter than the housing portion 13 and the conical portion 15. Such an arrangement is effective to reduce the bypass magnetic flux.

The electromagnetic valve of the present invention may be applied to the other valve such as a valve for a pneumatic or hydraulic control system.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An electromagnetic actuator, comprising:

a coil;

a movable core; and a stator core that forms a magnetic flux circuit with the movable core and attracts the movable core in an attracting direction when the coil is energized, wherein the stator core comprises:

a housing portion that houses the movable core; and an attracting portion located on an attracting side relative to the housing portion, the attracting portion having an inner surface that has a uniform diameter over a movable range of the movable core, and an outer surface, the diameter of the outer surface being increased in the attracting direction, and an increasing rate of the diameter being decreased in the attracting direction.

2. The electromagnetic actuator according to claim 1, wherein the inner surface of the attracting portion faces an outer surface of the movable core radially, an axial length of a facing area of the inner surface and the outer surface is increased as the movable core is attracted in the attracting direction.

3. The electromagnetic actuator according to claim 2, further comprising a valve that is operated by the plunger.

4. An electromagnetic actuator, comprising:

a coil;

a movable core; and a stator core that forms a magnetic flux circuit with the movable core and attracts the movable core in an attracting direction when the coil is energized, wherein the stator core comprises:

a housing portion that houses the movable core; and an attracting portion located on an attracting side relative to the housing portion, the attracting portion having an inner surface that has a uniform diameter over a movable range of the movable core, and an outer surface, the diameter of the outer surface being increased in the attracting direction, and an increasing rate of the diameter being decreased in the attracting direction, wherein the outer surface is defined by a plurality of tapered surfaces inclined outwardly in the attracting direction, an inclination angle of the tapered surface is greater than that of the other tapered surface located on the attracting direction relative to the tapered surface.

5. The electromagnetic actuator according to claim 1, wherein the outer surface of the attracting portion is defined by a convex curve.

6. The electromagnetic actuator according to claim 1, further comprising an axial facing portion located on the attracting side relative to the movable core to face the movable core in an axial direction, wherein the axial facing portion defines a parallel gap with the movable core.

7. The electromagnetic actuator according to claim 1, wherein the increasing rate of the outer surface of the attracting portion is decreased so as to guide a magnetic flux in an oblique direction when the movable core radially faces the attracting portion via a relatively large facing area.

8. The electromagnetic actuator according to claim 1, wherein the inner surface of the attracting portion includes a facing area that faces an outer surface of the movable core when the movable core is attracted in the attracting direction, and the outer surface of the attracting portion having the increasing diameter is located radial outside of the facing area.

9. The electromagnetic actuator according to claim 1, wherein the housing portion and the attracting portion are formed integrally.

10. The electromagnetic actuator according to claim 9, wherein the stator core further comprising a thin wall portion that connects the housing portion and the attracting portion.

11. An electromagnetic actuator, comprising:
a coil;
a movable core; and
a stator core that forms a magnetic flux circuit with the movable core and attracts the movable core in an attracting direction when the coil is energized, wherein the stator core comprises:
a housing portion that houses the movable core;
an attracting portion located on an attracting side relative to the housing portion, the attracting portion having an inner surface that has a uniform diameter over a movable range of the movable core and faces an outer surface of the movable core, an outer surface having diameter that is increased in the attracting direction, for providing a magnetic flux passing through the attracting portion and the movable portion in an oblique direction; and
means for providing an auxiliary magnetic flux passing through the attracting portion and the movable core in the oblique direction or an axial direction when the movable core is attracted a predetermined distance from an initial position, wherein the means is provided by decreasing an increasing rate of the diameter of the outer surface in the attracting direction.

12. An electromagnetic actuator, comprising
a coil;
a movable core; and
a stator core that forms a magnetic flux circuit with the movable core and attracts the movable core in an attracting direction when the coil is energized, wherein the stator core comprises:
a housing portion that houses the movable core;
an attracting portion located on an attracting side relative to the housing portion, the attracting portion having an inner surface that has a uniform diameter over a movable range of the movable core and faces an outer surface of the movable core, an outer surface having diameter that is increased in the attracting direction, for providing a magnetic flux passing through the attracting portion and the movable portion in an oblique direction; and
means for providing an auxiliary magnetic flux passing through the attracting portion and the movable core in the oblique direction or an axial direction when the movable core is attracted a predetermined distance from an initial position,
wherein the means is provided by decreasing an increasing rate of the diameter of the outer surface in the attracting direction,
wherein the means is provided by a tapered surface that provides a smaller inclination angle at a position located on the attracting side relative to the other position.

13. An electromagnetic actuator, comprising:
a coil;
a movable core; and
a stator core that forms a magnetic flux circuit with the movable core and attracts the movable core in an attracting direction when the coil is energized, wherein the stator core comprises:
a housing portion that houses the movable core;
an attracting portion located on an attracting side relative to the housing portion, the attracting portion having an inner surface that has a uniform diameter over a movable range of the movable core and faces an outer surface of the movable core, an outer surface having diameter that is increased in the attracting direction, for providing a magnetic flux passing through the attracting portion and the movable portion in an oblique direction; and
means for providing an auxiliary magnetic flux passing through the attracting portion and the movable core in the oblique direction or an axial direction when the movable core is attracted a predetermined distance from an initial position,
wherein the means is an axial facing portion located on the attracting side relative to the movable core to face the movable core in an axial direction.

14. The electromagnetic actuator according to claim 4, wherein the inner surface of the attracting portion faces an outer surface of the movable core radially, an axial length of a facing area of the inner surface and the outer surface is increased as the movable core is attracted in the attracting direction.

15. The electromagnetic actuator according to claim 14, further comprising a valve that is operated by the plunger.

16. The electromagnetic actuator according to claim 4, wherein the outer surface of the attracting portion is defined by a convex curve.

17. The electromagnetic actuator according to claim 4, further comprising an axial facing portion located on the attracting side relative to the movable core to face the movable core in an axial direction, wherein the axial facing portion defines a parallel gap with the movable core.

18. The electromagnetic actuator according to claim 4, wherein the increasing rate of the outer surface of the attracting portion is decreased so as to guide a magnetic flux in an oblique direction when the movable core radially faces the attracting portion via a relatively large facing area.

19. The electromagnetic actuator according to claim 4, wherein the inner surface of the attracting portion includes a facing area that faces an outer surface of the movable core when the movable core is attracted in the attracting direction, and the outer surface of the attracting portion having the increasing diameter is located radial outside of the facing area.

20. The electromagnetic actuator according to claim 4, wherein the housing portion and the attracting portion are formed integrally.

21. The electromagnetic actuator according to claim 20, wherein the stator core further comprises a thin wall portion that connects the housing portion and the attracting portion.

22. The electromagnetic actuator according to claim 12, wherein the means further includes an axial facing portion located on the attracting side relative to the movable core to face the movable core in an axial direction.

23. The electromagnetic actuator according to claim 13, wherein the axial facing portion is inclined inwardly in the attracting direction.

24. The electromagnetic actuator according to claim 13, wherein the axial facing portion defines a surface substantially parallel with respect to the facing surface of the movable core to form a parallel gap therebetween.

25. The electromagnetic actuator according to claim 11, wherein the means further includes an axial facing portion located on the attracting side relative to the movable core to face the movable core in an axial direction.

* * * * *